United States Patent [19]

Smedberg et al.

[11] Patent Number: 4,736,615

[45] Date of Patent: Apr. 12, 1988

[54] PNEUMATIC PRESS COUNTERBALANCE

[75] Inventors: Kenneth L. Smedberg, 5 Oak Hill Dr., Crete, Ill. 60417; George J. Bozich, Chicago; Robert J. Kotynski, South Holland, both of Ill.

[73] Assignee: Kenneth L. Smedberg, Crete, Ill.

[21] Appl. No.: 21,981

[22] Filed: Mar. 5, 1987

Related U.S. Application Data

[63] Continuation-in-part of Ser. No. 6,732, Jan. 22, 1987.

[51] Int. Cl.$^4$ .............................. B21D 24/02
[52] U.S. Cl. ................... 72/453.13; 72/344; 267/119; 267/122; 267/130; 100/259
[58] Field of Search ............. 72/453.13, 347, 348, 72/349, 344, 456, 455; 267/119, 118, 122, 130; 100/214, 259, 267

[56] References Cited

U.S. PATENT DOCUMENTS

| | | |
|---|---|---|
| 2,878,012 | 3/1959 | Crites ................... 267/119 |
| 3,295,846 | 1/1967 | Robertson ............. 267/119 |
| 3,488,045 | 1/1970 | Balunas, Jr. et al. ... 267/119 |
| 3,511,491 | 5/1970 | Kraft ..................... 267/119 |
| 3,667,707 | 6/1972 | Mui ....................... 267/119 |
| 3,989,232 | 11/1976 | Steinbach et al. .... 267/119 |
| 4,597,475 | 7/1986 | Lassig et al. ......... 267/119 |
| 4,657,229 | 4/1987 | Thurow ................. 267/122 |

FOREIGN PATENT DOCUMENTS

| | | | |
|---|---|---|---|
| 841379 | 4/1952 | Fed. Rep. of Germany ...... | 267/122 |
| 2515295 | 4/1983 | France ................................. | 267/122 |
| 131850 | 10/1981 | Japan .................................. | 267/122 |
| 153134 | 11/1981 | Japan .................................. | 267/122 |
| 1191308 | 11/1985 | U.S.S.R. ............................. | 100/259 |

*Primary Examiner*—David Jones
*Attorney, Agent, or Firm*—Anthony S. Zummer

[57] ABSTRACT

The present invention relates to a pneumatic press counterbalance which holds selected parts of a press in the same relative engagement during the return stroke of a ram as during the power stroke of that ram. The counterbalance includes a base plate adapted for connection to a first part of a press. An elongated cylindrical base tube having an open end is mounted on the base plate and has a center axis substantially perpendicular to the base plate. A resilient unconfined tubular bellows for holding air has a pair of opposed ends. The bellows has an elongated tubular resilient sleeve connecting the open ends and formed integral therewith. One of the open ends of the bellows is sealingly connected to the base tube. A first portion of the tubular sleeve surrounds a portion of the base tube. A second portion of the tubular sleeve is connected to the first portion by a fold in the sleeve and has a part surrounding the first portion. A movable plate is connected to the other end of the bellows. The movable plate is connected to a second part of the press movable relative to the first part of the press.

15 Claims, 3 Drawing Sheets

PNEUMATIC PRESS COUNTERBALANCE

Reference To Co-Pending Application

This is a continuation-in-part of patent application Ser. No. 006,732, filed Jan. 22, 1987, entitled "Pneumatic Press Counterbalance And Cushion Construction".

BACKGROUND OF THE INVENTION

The present invention relates to a counterbalance for use on a press and an improved cushion construction. In certain press operations, it is desirable to provide a counterbalance on a press. A typical construction for such a counterbalance is disclosed in U.S. Pat. No. 2,084,066, issued June 15, 1937, to F. J. Rode et al., entitled, "Metalworking Press". The Rode metalworking press utilizes a pneumatic cylinder embodying piston rods connected to pistons within cylinders to act as counterbalancing devices. The use of various additional systems for counterbalancing various presses is shown in the following patents: U.S. Pat. Nos. 1,970,134, issued Aug. 14, 1934, to W. Ferris, entitled, "Hydraulic Press"; 2,483,597, issued Oct. 4, 1949, to C. E. Schogren, entitled, "Supplemental Forging Press Die"; 3,115,676, issued Dec. 31, 1963, to O. F. Quartullo entitled, "High Speed Forging Apparatus"; 3,776,020, issued Dec. 4, 1973, to Fedosenko et al., entitled, "High-Speed Pressing Maching"; 3,834,216, issued Sept. 10, 1974, to Shiller et al., entitled, "Forging Press"; 3,914,975, issued Oct. 28, 1975, to Kawano, entitled, "Hydraulic Press Brake"; 4,148,209, issued Apr. 10, 1979, to Bessho, entitled, "Forging Press"; and 4,291,571, issued Sept. 29, 1981, to Claussen, entitled, "Forging Press". In addition, West German Auslegeschrift No. 1 294 334, published May 8, 1969, discloses a cylinder construction for use with a press, as does USSR Publication Nos. 338 034 and 1 031 617, of Sept. 15, 1981 and July 30, 1983, respectively.

In those prior art devices wherein pneumatic cylinders are used, there is generally air leakage in the cylinder which requires air to be replenished to the cylinder, thereby increasing the operating costs of the press.

Stacking of the resilient bellows is well known and accepted in the transportion industry. U.S. Pat. No. 2,773,686, issued Dec. 11, 1956, to C. B. Nash, entitled "Air Spring" discloses a construction wherein two bellows are interconnected. The Nash connector utilizes a conventional construction. The conventional construction for bellows of this type is also shown in the following patents: U.S. Pat. Nos. 2,827,283, issued Mar. 18, 1958, to K. A. Browne et al., entitled, "Air Spring With Damping Valve"; 2,887,069, issued May 19, 1959, to R. L. Lich, entitled, "Air Spring Railway Truck"; 2,902,291, issued Sept. 1, 1959, to L. B. Walker, entitled, "Vehicle Pneumatic Suspension System"; and 2,999,682, issued Sept. 12, 1961, to E. Stump, entitled, "Pneumatic Spring System For Motor Vehicles". This means for connecting the bellows to another portion requires the utilization of a plurality of bolts, which in many instances, are difficult to install and provide an opportunity to allow air to leak.

It is an objection of the instant invention to provide an improved counterbalance counstruction and a cushion which reduces air loss to a minimum.

It is a further object of the present invention to provide a pneumatic counterbalance and cushion which may be readily and easily installed.

SUMMARY OF THE INVENTION

The herein disclosed invention relates to a pneumatic press counterbalance which holds selected parts of a press in the same relative engagement during the return stroke of the ram of the press as during the power stroke of that ram. The balance includes a fixed plate which may be attached to a part of the press. A tube having one end open is mounted on the fixed plate and the tube has a center axis substantially perpendicular to the plate. A resilient unconfined tubular bellows for retaining air has a pair of opposed ends. The bellows has an elongated tubular resilient sleeve connecting the open ends, and the sleeve is formed integral with the open ends. One of the open ends of the bellows is sealingly connected to the open end of the tube. A first portion of the tubular sleeve surrounds a portion of the open end of the tube. A second portion of the tubular sleeve is connected to the first portion of the sleeve by a fold in the sleeve and has a part surrounding the first portion. A movable plate is connected to the other end of the bellows. The movable plate is adapted for connection to a second part of the press movable relative to the first part of the press. A guide rod has one end fixed to the base plate, and the movable plate is movably connected to the guide rod which limits movement of the plate to a straight line motion. Movement of the movable plate toward the first plate compresses air within the resilient pneumatic bellows. When the movable plate moves away from the fixed plate, the air compressed in the bellows urges the movable plate away from the fixed plate to hold certain parts of the press in the same relative engagement as during movement of the movable plate toward the fixed plate.

DESCRIPTION OF THE PREFERRED EMBODIMENT

Figure 1:
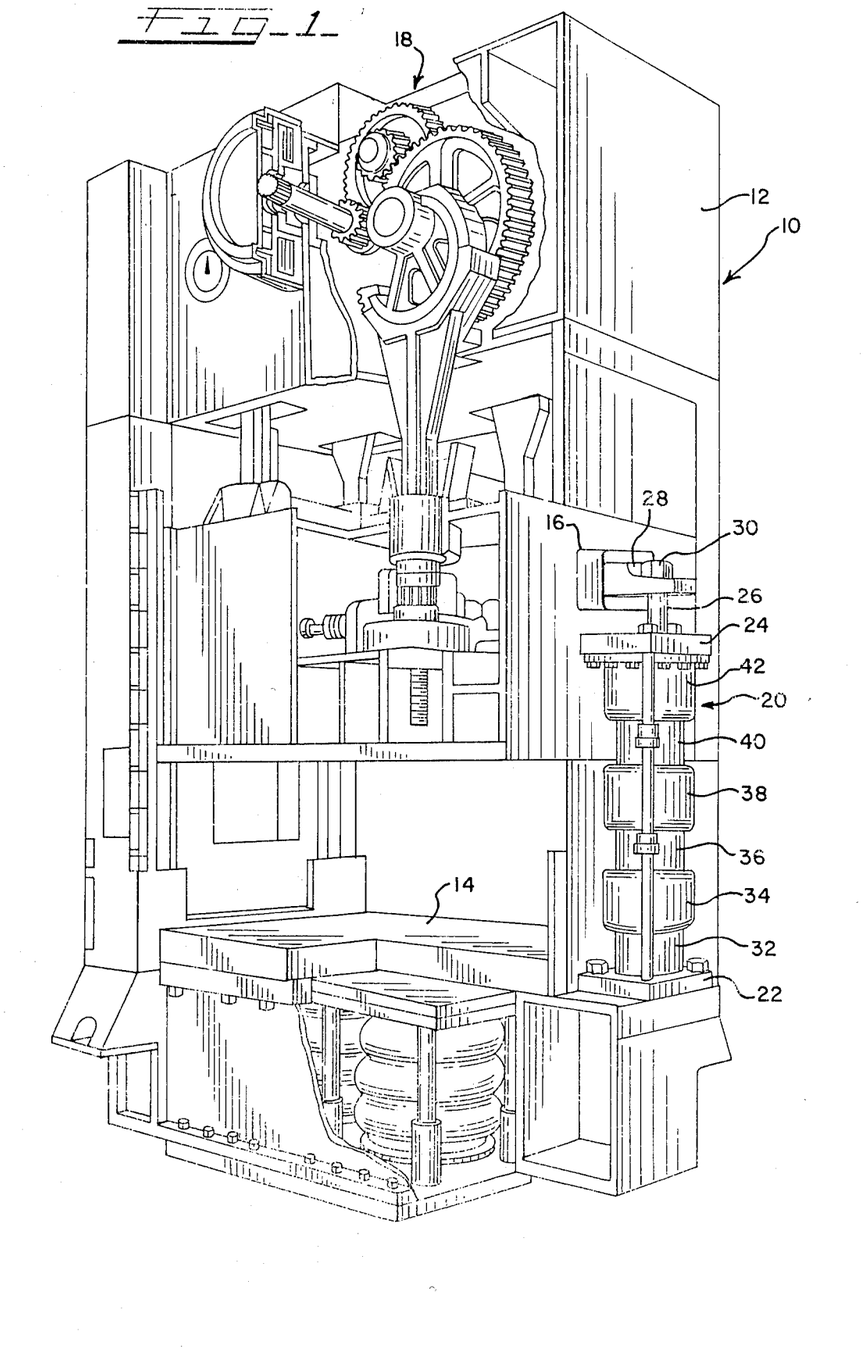
FIG. 1 is a perspective view of a conventional power press having a pneumatic counterbalance mounted thereon, which counterbalance is a specific embodiment of the instant invention.

Referring now to the drawings, and especially to FIG. 1, a conventional power press generally indicated by numeral 10 is shown therein. Press 10 is conventional in its construction in that it includes a conventional frame 12 with a conventional bed 14 mounted within the frame. A conventional ram 16 is movably mounted in the frame and is driven by a conventional drive assembly 18. A pneumatic counterbalance 20, being a specific embodiment of the present invention, is shown mounted on press 10. A like counterbalance is mounted on the other side of the press and is not shown herein.

Counterbalance 20 generally includes a fixed plate 22 which is secured to the frame and a movable plate 24 which is fixedly connected to ram 16 through a column 26 which is secured to a hanger 28 by a nut 30. The counterbalance also includes a base tube 32 fixed to plate 22. A lower unconfined bellows 34 has its lower end sealingly connected to tube 32. A first connector 36 is sealingly connected to the upper end of the lower bellows. An intermedrate unconfined bellows 38, identical in construction to bellows 34, has its lower end sealingly connected to connector 36. A second connector 40, identical in construction to connector 36, is sealingly connected to the upper end of intermediate bellows 38. An upper unconfined bellows 42 has its lower end sealingly connected to connector 40. Upper bellows 42 has its upper end sealingly connected to movable plate 24.

Figure 2:
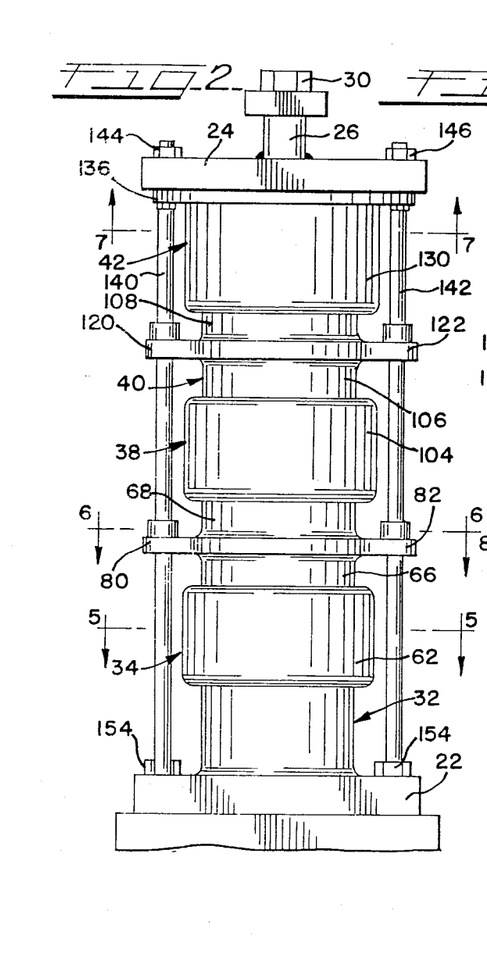
FIG. 2 is an enlarged side elevational view of the counterbalance shown in FIG. 1.
Figure 3:
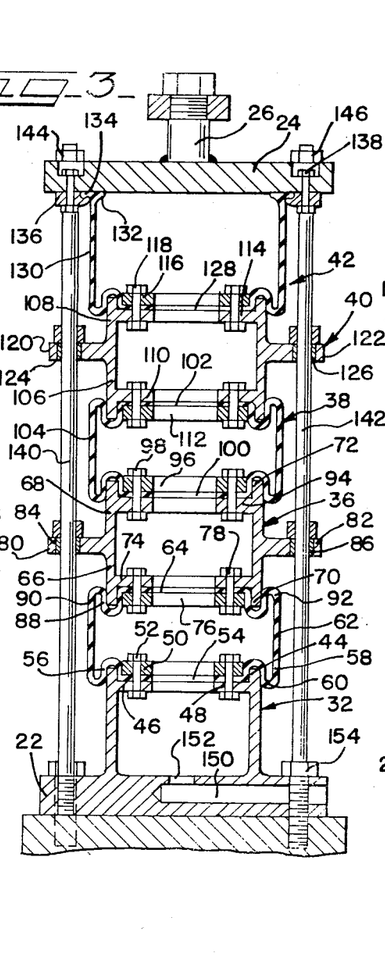
FIG. 3 is a cross sectional view of the counterbalance shown in FIG. 1 showing the counterbalance in its fully extended attitude.
Figure 4:
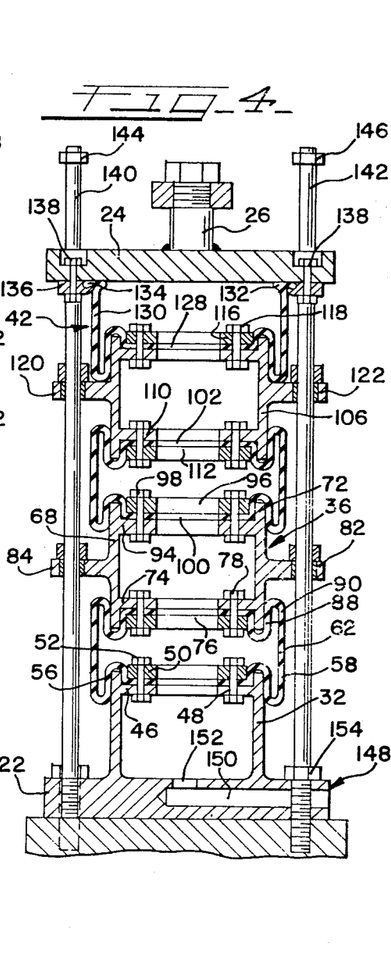
FIG. 4 is a cross sectional view similar to FIG. 3 but showing the counterbalance in a partially compressed position.
Figure 5:
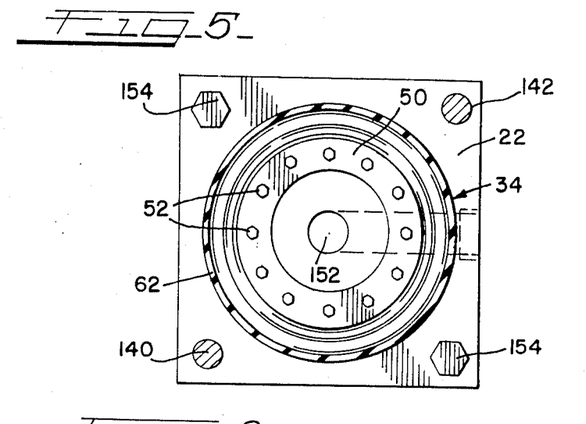
FIG. 5 is a cross sectional view taken on Line 5—5 of FIG. 2.
Figure 6:
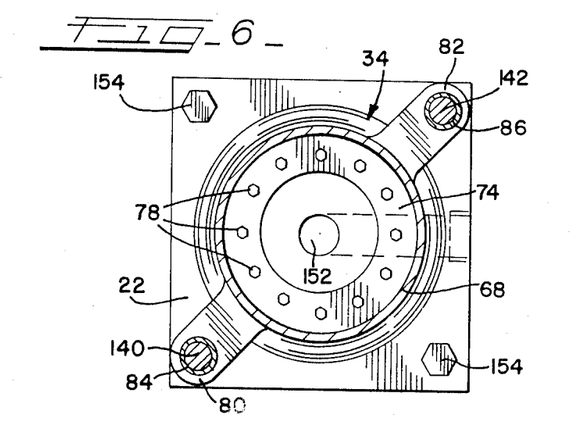
FIG. 6 is a cross sectional view taken on Line 6—6 of FIG. 2.
Figure 7:
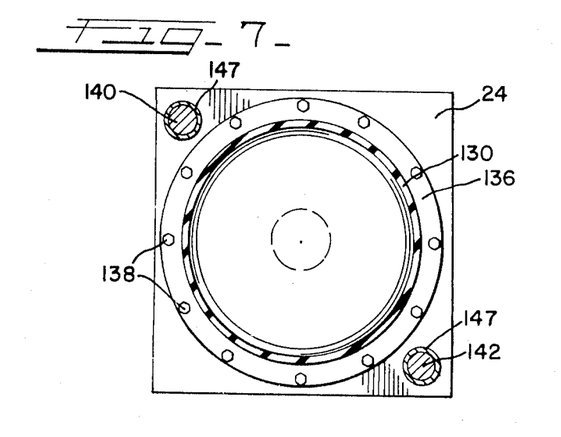
FIG. 7 is a cross sectional view taken on Line 7—7 of FIG. 2.

Referring now to FIGS. 2, 3 and 4, base tube 32 has one end formed integral with fixed plate 22 and the opposite end is free end 44. Base tube 32 is a right circular cylinder wherein the tube has a center axis which is perpendicular to fixed plate 22. An internal annular sealing ledge 46 is formed integral with the interior of tube 32 adjacent to free end 44. The sealing ledge has a plurality of bolt holes 48 formed therein for receiving a bolt in each of the holes. A mating clamp ring 50 is connected to sealing ledge 46 by a plurality of identical bolts 52.

Lower bellows 34, which is an integral resilient member, has an open end 54 which is sealingly secured to sealing ledge 46 by clamp ring 50. The lower bellows has a first portion 56 which is connected to the open end 54 and surrounds a portion of the free end of base tube 32. Bellows 34 has a second portion 58 which is formed integral with the first portion and is connected by a fold 60. Second portion 58 surrounds first portion 56. The second portion 58 is part of a resilient tubular sleeve 62 which has another open end 64 at the opposite end of the sleeve.

Connector 36 includes a pair of identical opposed connector tubes 66 and 68 which are formed integral with each other and extend opposite to each other. Connector tube 66 includes a free end 70, and connector tube 68 includes a free end 72. Tube 66 has an internal annular sealing ledge 74 formed integral with the interior wall of the tube adjacent to free end 70. A clamp ring 76 is secured to sealing ledge 74 by a plurality of conventional bolts 78. The tubes 66 and 68 are both right circular cylinders so that an opening extends through connector 36. The first connector includes a pair of ears 80 and 82 formed integral with tubes 66 and 68. Bushings 84 and 86 are mounted in ears 80 and 82, respectively.

The other open end 64 of bellows 34 is sealingly secured to sealing ledge 74 by clamp ring 76. Bellows 34 includes a third portion 88 which surrounds a portion of the free end of tube 66 and is connected to a fourth portion 90 by a fold 92. The fourth portion 90 surrounds third portion 88. Fourth portion 90 is formed integral with the second portion 58. Tube 68 includes an internal annular sealing ledge 94 and a clamp ring 96 is secured to ledge 94 by a plurality of conventional bolts 98.

Intermediate integral resilient bellows 38 is constructed identically to lower bellows 34. Bellows 38 includes an open end 100 which is sealingly connected to sealing ledge 94 by clamp ring 98. The interconnection of the bellows with sealing ledge 94 is identical to that described in relation to the connection of open end 54 of lower bellows 34 with base tube 32. Bellows 38 has an open end 102 which is connected by a resilient tubular sleeve 104 to open end 100.

Connector 40 is identical in construction to connector 36. Connector 40 has a pair of opposed right circular cylindrical connector tubes 106 and 108 which extend away from each other. A internal annular sealing ledge 110 is formed integral with the interior of tube 106 and a clamp ring 112 sealingly connects open end 102 to tube 106. Tube 108 includes an internal annular sealing ledge 114 which has a clamp ring 116 secured thereto by a plurality of bolts 118. Ears 120 and 122 are formed integral with tubes 106 and 108, respectively. Bushings 124 and 126 are mounted in ears 120 and 122, respectively.

Upper integral resilient bellows 42 has an open end 128 which is sealingly connected to sealing ledge 114 by clamp ring 116. The open end 128 is connected to a resilient tubular sleeve 130. The connection between tubular sleeve 130 and open end 128 is identical to the interconnection of tubular sleeve 62 with open end 54 described in detail above. The tubular sleeve 130 has an upper open end 132 which includes an annular lip 134. An upper clamp ring 136 engages the lip 134, and a plurality of bolts 138 secure clamp ring 136 to movable plate 24 to form a seal between the open end 132 and the movable plate. Column 26 is fixed to movable plate 24.

A pair of guide rods 140 and 142 are parallel to each other. Each of the guide rods is threadedly mounted in fixed plate 22. Stop nuts 144 and 146 are threadedly mounted on the upper end of guide rods 140 and 142, respectively. Connector 36 has its bushings 84 and 86 slideably mounted on the guide rods 140 and 142, respectively. Connector 40 has its bushings 124 and 126 slideably mounted on the guide rods 140 and 142, respectively. Movable plate 24 also has bushings 147, which bushings slideably engage guide rods 140 and 142 so that the movable plate and two connectors move in substantially a straight line relative to the fixed plate since they are restrained by guide rods 140 and 142 to such a motion.

Fixed plate 22 includes an air inlet 148 which alloys air to enter the interior of tube 32. The air inlet includes a radial passage 150 which connects with an axial passage 152. The axial passage opens into the interior of tube 32. The radial passage 150 is connected to a conventional source of air under pressure through a conventional and well known regulator valve to keep the pressure of the air within the three bellows at a selected uniform pressure.

The fixed plate is secured to the frame of the press by a pair of machine screws 154.

In operation, when ram 16 is moved downward toward bed 14, the movable plate 24 is pushed toward fixed plate 22. As the movable plate is moved downward, the upper bellows has a greater portion of its portion surrounding the tube 108 moved downward through the fold which moves downward. As may be seen in FIG. 4, each of the bellows has a greater portion of the tubular sleeves moved into an attitude surrounding the respective tubes. The air contained in the bellows and in the connectors is compressed. All of the bellows are interconnected through the connectors so that there is a substantially uniform pressure in the bellows. Once ram 16 reaches the bottom of its stroke and starts its return motion, the air compressed in the balance pushes upward against the ram so that selected parts are held in the same relative engagement on the return stroke as well as on the power stroke.

It may be appreciated that though three bellows have been shown herein, a balance may be built having less bellows or more bellows simply by the removal of connectors or the addition of connectors. In view of the fact that there is a fixed seal between the bellows and the other parts, it is readily apparent that the likelihood of any leaks occuring is greatly diminished thereby conserving air.

Although a specific embodiment of the herein disclosed invention has been shown and described in detail above, it is readily apparent that those skilled in the art may make various modifications and changes without departing from the spirit and scope of the present invention. It is to be expressly understood that the instant invention is limited only by the appended claims.

We claim:

1. A pneumatic counterbalance for holding selected parts of a press in the same relative engagement during a return stroke of a ram of the press as during a power stroke of the ram, comprising, in combination, a first plate connected to a first part of the press, an elongated cylindrical tube having one end mounted on the first plate and having a center axis substantially perpendicular to the plate, an unconfined resilient tubular bellows for holding air having a pair of opposed open ends, said bellows having an elongated tubular resilient sleeve connecting the open ends and formed integral therewith, one of the open ends of the bellows sealingly connected to the tube, a first portion of the tubular sleeve surrounding a portion of the other end of the tube, a second portion of the tubular sleeve connected to the first portion of the tubular sleeve by a fold in the sleeve and having a part surrounding the first portion, and a second plate connected to the other open end of the bellows, said second plate connected to a second part of the press movable relative to the first part of the press, said first plate and the second plate being movable relative to each other, whereby movement of the plates toward each other places a part of the second portion of the tubular sleeve in engagement with an additional portion of the tube adjacent to the first portion of the tubular sleeve and air contained in the bellows is compressed.

2. A pneumatic counterbalance for holding selected parts of a press in the same relative engagement during a return stroke of the ram of the press as during the power stroke of the ram as defined in claim 1, including; a plurality of guide rods, each of said guide rods having one end fixed to one of said plates, the other of said plates being slideably connected to the guide rods for controlling the direction of movement of the plates relative to each other to a substantially straight line movement, an air inlet providing an air passage from the exterior of the tube to the interior of the tube to allow air to flow to the interior of the bellows, said tube having a substantially circular cross section, a connector having a first connector tube sealingly connected to the other open end of the first mentioned bellows, a second unconfined resilient bellows for holding air having a pair of opposed open ends, said second bellows having an elongated resilient tubular sleeve extending between the open ends and being formed integral therewith, one open end of the second bellows sealingly fixed to a second connector tube of the connector, a first portion of the tubular sleeve of the second bellows surrounding a portion of a free end of the second connector tube, a second portion of the tubular sleeve of the second bellows connected to the first portion of the tubular sleeve of the second bellows by a fold in the sleeve of the second bellows and having a part surrounding the first portion of the tubular sleeve of the second bellows, and said second portion of the tubular sleeve of the second bellows having the other open end of the second bellows connected to the second plate, whereby movement of the plates toward each other causes air in the first mentioned and second bellows to be compressed and creates a force opposing movement of the plates toward each other.

3. A pneumatic counterbalance for holding selected parts of a press in the same relative engagement during a return stroke of a ram of the press as during a power stroke of the ram as defined in claim 1, including; a connector having a pair of integral opposed connector tubes extending away from each other, each of said connector tubes having a free end, an internal sealing ledge formed integral with the interior of each of said connector tubes at its respective free end, a clamp ring connected to each sealing ledge, the other open end of the bellows positioned adjacent to a sealing ledge of one of said connector tubes, the other open end of the bellows sealingly secured to the sealing ledge by the respective clamp ring, a third portion of the tubular sleeve surrounding a portion of the free end of the one connector tube, a fourth portion of the tubular sleeve connected to the third portion of the tubular sleeve by a fold in the sleeve and having a part surrounding the third portion, said second and fourth portions of the tubular sleeve being formed integral with each other, a second unconfined resilient bellows for holding air having a pair of opposed open ends, said second bellows having an elongated resilient tubular sleeve extending between the open ends and being formed integral therewith, one end of the second bellows positioned adjacent to the sealing ledge of the other connector tube and being sealingly secured to the sealing ledge of the other connector tube by the respective clamp ring, a first portion of the tubular sleeve of the second bellows surrounding a portion of the other connector tube, a second portion of the tubular sleeve of the second bellows connected to the first portion of the tubular sleeve by a fold in the sleeve and having a part surrounding the first portion, said second portion of the tubular sleeve of the second bellows formed integral with the other open end, said second plate connected to the other open end of the second bellows, said connector interconnecting the interiors of the first and second bellows, whereby movement of the plates toward each other causes air contained in the first and second bellows to be compressed to substantially the same pressure.

4. A pneumatic counterbalance for holding selected parts of a press in the same relative engagement during a return stroke of the ram of the press as during the power stroke of the ram as defined in claim 1, wherein said cylindrical tube has one end formed integral with the first plate, said tube includes an internal annular sealing ledge formed integral with the interior of the tube, a clamp ring connected to the sealing ledge of the tube holding the one end of the bellows in sealing contact with the sealing ledge, a connector having a pair of integral opposed connector tubes extending away from each other providing a passage through the interior of the connector, each of said connector tubes having a free end, an internal annular sealing ledge formed integral with the interior of each of said connector tubes at its respective free end, a clamp ring connected to each sealing ledge of each of said connector tubes, the other open end of the bellows held in sealing engagement with the sealing ledge of one of said connector tubes by the respective clamp ring, a third portion of the tubular sleeve surrounding a portion of the tubular sleeve connected to the third portion of the tubular sleeve by a fold in the sleeve and having a part surrounding the third portion, a second unconfined resilient bellows for holding air having a pair of opposed open ends, said second bellows, including an elongated tubular sleeve extending between the open ends and formed integral therewith, one open end of the second bellows sealingly connected to the sealing ledge of the other connector tube and being held in sealing engagement therewith by the respective clamp ring, a first portion of the tubular sleeve of the second bellows surrounding a portion of the other connector tube, a second portion of the tubular sleeve of the second bellows connected to the first portion of the tubular sleeve of the second bellows by a fold in the sleeve and having a part surrounding the first portion of the tubular sleeve, said second plate sealingly connected to the other open end of the second bellows, and a pair of guide rods, each of said guide rods having one end fixed to the first plate, said second plate and the connector movably connected to the guide rods and movable relative to the guide rods limiting movement of the second plate and the connector relative to the first plate to a substantially straight line movement, whereby movement of the plates toward each other causes air in the first mentioned and second bellows to be compressed.

5. A pneumatic counterbalance for holding selected parts of a press in the same relative engagement during a return stroke of a ram of the press as during the power stroke of the ram as defined in claim 1, wherein said tube has a substantially circular cross section, whereby movement of the plates toward each other creates a substantially constant force opposing movement of the plates toward each other.

6. A pneumatic counterbalance for holding selected parts of a press in the same relative engagement during a return stroke of a ram of the press as during the power stroke of the ram as defined in claim 1, including; an air inlet providing an air passage from the exterior of the tube to the interior of the tube to provide air at a selected pressure to the interior of the bellows.

7. A pneumatic counterbalance for holding selected parts of a press in the same relative engagement during a return stroke of a ram of the press as during the power stroke of the ram as defined in claim 1, including; a connector having a pair of opposed connector tubes, one of said connector tubes sealingly fixed to the other open end of the first mentioned bellows, a second unconfined resilient bellows for holding air having a pair of opposed open ends, said second bellows having an elongated resilient tubular sleeve extending between the open ends and being formed integral therewith, one end of the second bellows sealingly fixed to the other connector tube, a first portion of the tubular sleeve of the second bellows surrounding a portion of the other connector tube, a second portion of the tubular sleeve of the second bellows connected to the first portion of the tubular sleeve by a fold in the sleeve and having a part surrounding the first portion, said second portion of the tubular sleeve of the second bellows formed integral with the other open end, said second plate connected to the other open end of the second bellows, whereby movement of the plates toward each other causes air contained in the first and second bellows to be compressed to substantially the same pressure.

8. A pneumatic counterbalance for holding selected parts of a press in the same relative engagement during a return stroke of a ram of the press as during the power stroke of the ram as defined in claim 1, wherein the tube has a substantially circular cross section, a connector having a pair of opposed connector tubes, each of said connector tubes having a circular cross section, said first mentioned bellows having the other open end sealingly fixed to one of said connector tubes, a second unconfined resilient bellows for holding air having a pair of opposed open ends, said second bellows including an elongated tubular sleeve extending between the open ends and formed integral therewith, one open end of the second bellows sealingly fixed to the other connector tube, a first portion of the tubular sleeve of the second bellows surrounding a portion of the other connector tube, a second portion of the tubular sleeve of the second bellows connected to the first portion of the tubular sleeve of the second bellows by a fold in the sleeve and having a part surrounding the first portion of the tubular sleeve, said second portion of the tubular sleeve of the second bellows formed integral with the other open end, said second plate sealingly connected to the other open end of the second bellows, whereby movement of the plates toward each other causes air in the first mentioned and second bellows to be compressed.

9. A pneumatic counterbalance for holding selected parts of a press in the same relative engagement during a return stroke of a ram of the press as during the power stroke of the ram as defined in claim 1, wherein the tube has a substantially circular cross section, and an air inlet providing an air passage from the exterior of the tube to the interior of the bellows, whereby movement of the bellows toward each other has a substantially constant force opposing movement of the plates toward each other created by air in the bellows being compressed.

10. A pneumatic counterbalance for holding selected parts of a press in the same relative engagement during a return stroke of a ram of the press as during the power stroke of the ram as defined in claim 1, wherein said tube has a substantially circular cross section, a connector having a pair of opposed connector tubes extending away from each other, each of said connector tubes having a substantially circular cross section, a guide rod fixed to one of said plates and movably engaging the other plate and the connector to limit movement of the other plate and the connector to substantially straight line movement, and a second unconfined resilient bellows for holding air having a pair of opposed open ends, said second bellows having an elongated resilient tubular sleeve extending between the open ends formed integral therewith, one open end of the second bellows sealingly fixed to the free end of one of said connector tubes, a first portion of the tubular sleeve of the second bellows surrounding a portion of the free end of said one of the connector tubes, a second portion of the tubular sleeve of the second bellows connected to the first portion of the tubular sleeve by a fold in the sleeve and having a part surrounding the first portion of the tubular sleeve, said second portion of the tubular sleeve of the second bellows formed integral with the other open end of the second bellows, said second plate connected to the other open end of the second bellows, whereby movement of the plates toward each other causes the air contained in the first mentioned and second bellows to be compressed.

11. A pneumatic counterbalance for holding selected parts of a press in the same relative engagement during a return stroke of a ram of the press as during the power stroke of the ram as defined in claim 1, including; an air inlet providing an air passage from the exterior of the tube to the interior of the bellows, a connector having a pair of opposed connector tubes extending away from each other, each of said connector tubes having a free end, a second unconfined resililent bellows for holding air having a pair of opposed open ends, said second bellows having an elongated resilient tubular sleeve extending between the open ends and formed integral therewith, one open end of the second bellows sealingly fixed to one of the connector tubes, a first portion of the tubular sleeve of the second bellows surrounding a portion of the free end of the one of the connector tubes, a second portion of the tubular sleeve of the second bellows connected to the first portion of the tubular sleeve of the second bellows by a fold in the tubular sleeve and having a part surrounding the first portion of the tubular sleeve, said second portion of the tubular sleeve of the second bellows formed integral with the other open end of the second bellows, said connector interconnecting the interiors of the first mentioned and second bellows, whereby movement of the plates toward each other causes air contained in the first mentioned and second bellows to be compressed.

12. A pneumatic counterbalance for holding selected parts of a press in the same relative engagement during a return stroke of the ram of the press as during the power stroke of the ram as defined in claim 1, wherein the tube has a substantially circular cross section, a connector having a pair of opposed connector tubes extending away from each other, each of said connector tubes having a free end, the first mentioned bellows having the other of its open ends sealingly fixed to one of the connector tubes, each of said connector tubes having a circular cross section, a second unconfined resilient bellows for holding air having a pair of opposed open ends, said second bellows having an elongated resilient tubular sleeve extending between the opposed open ends and being formed integral with the open ends, one open end of the second bellows sealingly fixed to the other of the connector tubes, a first portion of the tubular sleeve of the second bellows surrounding a portion of the free end of the other of the connector tubes, a second portion of the tubular sleeve of the second bellows connected to the first portion of the tubular sleeve of the second bellows by a fold in the tubular sleeve and having a part surrounding the first portion of the tubular sleeve, said second portion of the tubular sleeve of the second bellows formed integral with the other open end of the second bellows, said connector interconnecting the interiors of the first mentioned and second bellows, the other open end of the second bellows sealingly connected to the second plate, whereby movement of the plates toward each other causes air contained in the first mentioned and second bellows to be compressed to substantially the same pressure and to maintain a force opposing movement of the plates toward each other.

13. A pneumatic counterbalance for holding selected parts of a press in the same relative engagement during a return stroke of the ram of the press as during the power stroke of the ram as defined in claim 1, wherein the tube has a substantially circular cross section, an air inlet providing an air passage from the exterior of the tube to the interior of the tube for the passage of air into and out of the first mentioned bellows, a connector having a pair of opposed connector tubes extending away from each other, each of said connector tubes having a free end and a substantially circular cross section, a guide rod having one end fixed to one of said plates and the other plate and the connector movable relative to the guide rod to limit movement of the other plate and connector relative to the first plate to a substantially straight line movement, the first mentioned bellows having the other of its open ends sealingly fixed to one of the connector tubes, a second unconfined resilient bellows for holding air having a pair of opposed open ends, said second bellows having an elongated tubular resilient sleeve extending between the opposed open ends and being formed integral with the open ends, one open end of the second bellows sealingly fixed to the other of the connector tubes, a first portion of the tubular sleeve of the second bellows surrounding a portion of the free end of the other of the connector tubes, a second portion of the tubular sleeve of the second bellows connected to the first portion of the tubular sleeve by a fold in the sleeve and having a part surrounding the first portion of the tubular sleeve, the other open end of the second bellows sealingly connected to the second plate, the connector interconnecting the interiors of the first mentioned and second bellows, whereby movement of the plates toward each other causes air in the first mentioned and second bellows to be compressed.

14. A pneumatic counterbalance for holding selected parts of a press in the same relative engagement during a return stroke of the ram of the press as during the power stroke of the ram as defined in claim 1, including; an air inlet providing an air passage from the exterior of the tube to the interior thereof to permit air to flow into and out of the interior of the bellows, a connector having a pair of opposed connector tubes extending away from each other, each of said connector tubes having a free end, the other of the open ends of the bellows sealingly connected to one of the connector tubes, a third portion of the tubular sleeve surrounding a portion of the free end of the one of the connector tubes, a fourth portion of the tubular sleeve connected to the third portion of the tubular sleeve by a fold in the sleeve and having a part surrounding the third portion, a second unconfined resilient bellows for holding air having a pair of opposed open ends, said second bellows having an elongated tubular sleeve extending between the open ends and being formed integral therewith, one open end of the second bellows sealingly fixed to the other connector tube, a first nortion of the tubular sleeve of the second bellows surrounding a portion of the free end of the other connector tube, a second portion of the tubular sleeve of the second bellows connected to the first portion of the tubular sleeve of the second bellows by a fold and having a part of the second portion surrounding the first portion, the other open end of the second bellows sealingly connected to the second plate, the connector interconnecting the interiors of the first mentioned and second bellows, whereby movement of the plates toward each other causes air contained in the first mentioned and second bellows to be compressed and to create a force opposing the movement of the plates toward each other.

15. A pneumatic counterbalance for holding selected parts of a press in the same relative engagement during a return stroke of the ram of the press as during the power stroke of the ram as defined in claim 1, including; an air inlet providing an air passage from the exterior of the tube to the interior of the tube for connection to the interior of the bellows to provide a means for passing air into and out of the bellows, the tube having a substantially circular cross section, a connector having a pair of opposed connector tubes extending away from each other, each of the connector tubes having a free end and a substantially circular cross section, the other of the open ends of the first mentioned bellows sealingly connected to one of the connector tubes, a third portion of the tubular sleeve surrounding a portion of the free end of the one of the connector tubes, a fourth portion of the tubular sleeve connected to the third portion of the tubular sleeve by a fold in the sleeve and having a part surrounding the third portion, a pair of guide rods substantially parallel to each other, each of said guide rods having one end fixed to one of said plates, the other of said plates and the connector movably connected to the guide rods to limit movement of the plate and the connector relative to the one of said plates to a substantially straight line movement, and a second unconfined resilient bellows for holding air having a pair of opposed open ends, said second bellows having an elongated tubular sleeve extending between the opposed open ends and being formed integrally therewith, one open end of the second bellows sealingly fixed to the other connector tube, a first portion of the tubular sleeve of the second bellows surrounding a portion of the free end of the other connector tube, a second portion of the tubular sleeve of the second bellows connected to the first portion of the tubular sleeve of the second bellows by a fold in the sleeve and having a part surrounding the first portion of the tubular sleeve, the second plate sealingly connected to the other open end of the second bellows, the connector interconnecting the interiors of the first mentioned and second bellows, whereby movement of the plates toward each other causes air in the first mentioned and second bellows to be compressed and cause a force opposing movement of the plates toward each other.

* * * * *

UNITED STATES PATENT AND TRADEMARK OFFICE
CERTIFICATE OF CORRECTION

PATENT NO. : 4,736,615
DATED : April 12, 1988
INVENTOR(S) : Kenneth L. Smedberg, et al.

It is certified that error appears in the above-identified patent and that said Letters Patent are hereby corrected as shown below:

Column 3, line 12, cancel "intermedrate" and substitute therefor --intermediate--.

Column 4, line 45, cancel "alloys" and substitute therefor --allows--.

Claim 4, column 7, line 9, before "tubular", insert --free end of the one connector tube, a fourth portion of the--.

Claim 14, column 10, line 55, cancel "nortion" and substitute therefor --portion--.

Signed and Sealed this

Ninth Day of August, 1988

Attest:

DONALD J. QUIGG

Attesting Officer

Commissioner of Patents and Trademarks